(12) United States Patent
Wakita et al.

(10) Patent No.: US 9,099,743 B2
(45) Date of Patent: Aug. 4, 2015

(54) ANODE AND SECONDARY BATTERY

(75) Inventors: Shinya Wakita, Fukushima (JP); Izaya Okae, Fukushima (JP)

(73) Assignee: SONY CORPORATION, Tokyo (JP)

( * ) Notice: Subject to any disclaimer, the term of this patent is extended or adjusted under 35 U.S.C. 154(b) by 418 days.

(21) Appl. No.: 12/368,650

(22) Filed: Feb. 10, 2009

(65) Prior Publication Data

US 2009/0214952 A1    Aug. 27, 2009

(30) Foreign Application Priority Data

Feb. 21, 2008    (JP) ................................. 2008-040112

(51) Int. Cl.
| | |
|---|---|
| *H01M 4/58* | (2010.01) |
| *H01M 4/587* | (2010.01) |
| *H01M 4/62* | (2006.01) |
| *H01M 10/0525* | (2010.01) |

(52) U.S. Cl.
CPC ................ *H01M 4/587* (2013.01); *H01M 4/58* (2013.01); *H01M 4/621* (2013.01); *H01M 10/0525* (2013.01); *Y02E 60/122* (2013.01)

(58) Field of Classification Search
CPC ....................................................... H01M 4/58
USPC ........ 423/409, 411; 429/231.1–231.3, 231.95
See application file for complete search history.

(56) References Cited

U.S. PATENT DOCUMENTS

| | | | |
|---|---|---|---|
| 6,566,011 B1 | 5/2003 | Takeda | |
| 7,687,201 B2 * | 3/2010 | Kim et al. | ...................... 429/213 |
| 8,383,275 B2 * | 2/2013 | Takami et al. | ................ 429/337 |

FOREIGN PATENT DOCUMENTS

| | | |
|---|---|---|
| JP | 07-085861 | 3/1995 |
| JP | 09-204936 | 8/1997 |
| JP | 10-247495 | 9/1998 |
| JP | HEI 11-288705 | 10/1999 |
| JP | 2001-052699 | 2/2001 |
| JP | 2004-511073 | 4/2004 |
| JP | 2006-066297 | 3/2006 |

OTHER PUBLICATIONS

Singapore Search Report/Written Opinion dated May 28, 2009 corresponding to Singapore Serial No. 200900317.9.
Japanese Office Action dated Nov. 20, 2012 for Japanese Application No. 2008-040112.
Japanese Office Action dated Aug. 7, 2012, issued in connection with counterpart Japanese Patent Application No. 2008-040112.

* cited by examiner

*Primary Examiner* — Stuart Hendrickson
(74) *Attorney, Agent, or Firm* — Dentons US LLP

(57) ABSTRACT

A secondary battery capable of providing a high energy density and superior cycle characteristics is provided. The secondary battery includes a cathode, an anode, and an electrolytic solution. The anode has an anode active material layer containing a carbon material and a lithium-containing compound ($Li_{3-a}M_aN$) as an anode active material. M is one or more transition metal elements. a is a numerical value satisfying $0 < a \leq 0.8$. The average particle diameter of the lithium-containing compound is 1 μm or less

8 Claims, 9 Drawing Sheets

ANODE AND SECONDARY BATTERY

CROSS REFERENCES TO RELATED APPLICATIONS

The present invention contains subject matter related to Japanese Patent Application JP 2008-040112 filed in the Japanese Patent Office on Feb. 21, 2008, the entire contents of which being incorporated herein by reference.

BACKGROUND OF THE INVENTION

1. Field of the Invention

The present invention relates to an anode using a carbon material as an anode active material and a secondary battery.

2. Description of the Related Art

In recent years, the size and the weight of portable electronic devices such as a mobile phone, a PDA (personal digital assistant), and a notebook computer have been aggressively decreased. As part thereof, an improvement of the energy density of a battery, in particular, a secondary battery as a power source for the portable electronic devices has been strongly demanded.

As a secondary battery to provide a high energy density, for example, a secondary battery using lithium (Li) as an electrode reactant has been known. Specially, a lithium ion secondary battery using a carbon material capable of inserting and extracting lithium for the anode has been widely and practically used. However, in the lithium ion secondary battery using a carbon material for the anode, the technique has been already developed to the level close to the theoretical capacity. Thus, as a means for further improving the energy density, it has been considered that the thickness of the active material layer is increased and thereby the ratio of the active material layer in the battery is increased and the ratios of the current collector and the separator are lowered as described in Japanese Unexamined Patent Application Publication No. 9-204936, for example.

SUMMARY OF THE INVENTION

However, in the case where the thickness of the active material layer is increased without changing the capacity of the battery, the area of the current collector is relatively decreased. Thus, there has been a disadvantage that the current density to the anode in charge is increased, and diffusion of lithium ions and electrochemical reception of lithium ions in the anode do not catch up with such an increased current density, and accordingly metal lithium is easily precipitated. In such metal lithium precipitated in the anode easily loses activity. As a result, the cycle characteristics are significantly lowered. Accordingly, it has been difficult to increase the thickness of the active material layer.

In view of the foregoing, in the invention, it is desirable to provide an anode having a superior discharge capacity and superior charge and discharge efficiency. Further, in the invention, it is desirable to provide a secondary battery capable of providing a high energy density and superior cycle characteristics.

According to an embodiment of the invention, there is provided an anode having an anode active material layer containing a carbon material and a lithium-containing compound expressed by Chemical formula 1 as an anode active material. The average particle diameter of the lithium-containing compound is 1 µm or less. According to an embodiment of the invention, there is provided a secondary battery including the anode of the embodiment of the invention, a cathode, and an electrolytic solution.

$$Li_{3-a}M_aN \qquad \text{Chemical formula 1}$$

In the formula, M is one or more transition metal elements, and a is a numerical value satisfying $0<a\leq0.8$.

In the anode and the secondary battery of the embodiments of the invention, the lithium-containing compound in which the average particle diameter is 1 µm or less is contained as an anode active material. Thus, diffusion characteristics and reception characteristics of lithium ions are improved. In addition, by increasing the thickness of the anode active material layer, a higher energy density is obtained.

According to the anode of the embodiment of the invention, the anode active material layer contains the carbon material and the lithium-containing compound in which the average particle diameter is 1 µm or less and expressed by Chemical formula 1 as an anode active material. Thus, a higher battery capacity and higher charge and discharge efficiency are able to be obtained. Further, according to the secondary battery of the embodiment of the invention including such an anode, a higher battery capacity and superior cycle characteristics are able to be obtained.

Other and further objects, features and advantages of the invention will appear more fully from the following description.

DETAILED DESCRIPTION OF THE PREFERRED EMBODIMENT

An embodiment of the invention will be hereinafter described in detail with reference to the drawings.

First Battery

Figure 1:
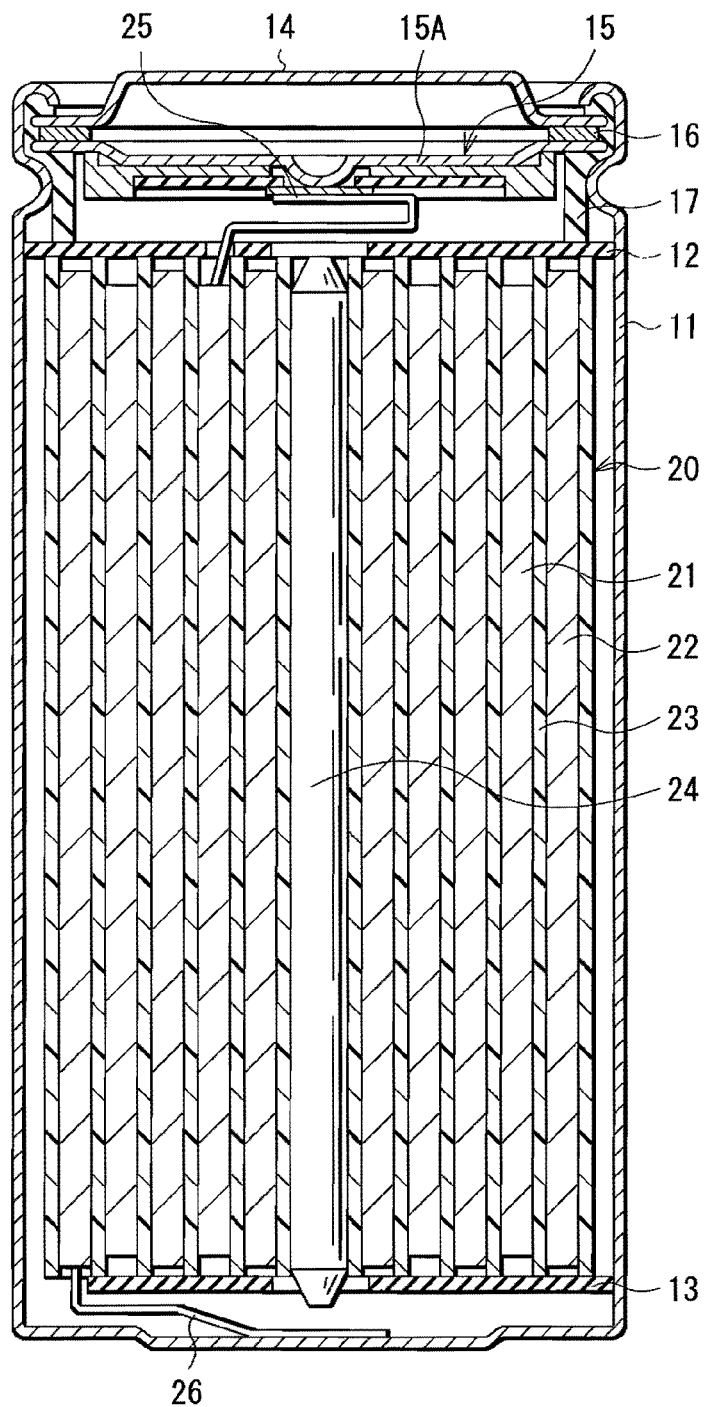
FIG. 1 is a cross sectional view illustrating a structure of a first secondary battery according to an embodiment of the invention.

FIG. 1 illustrates a cross sectional structure of a first secondary battery according to an embodiment of the invention. The secondary battery is a lithium ion secondary battery in which the anode capacity is expressed based on insertion and extraction of lithium as an electrode reactant. The secondary battery is a so-called cylinder-type battery, and has a spirally wound electrode body 20 in which a strip-shaped cathode 21 and a strip-shaped anode 22 are spirally wound with a separator 23 in between inside a battery can 11 in the shape of an approximately hollow cylinder. The battery can 11 is made of, for example, iron (Fe) plated by nickel (Ni). One end of the battery can 11 is closed, and the other end thereof is opened. Inside the battery can 11, a pair of insulating plates 12 and 13 is respectively arranged perpendicular to the spirally wound periphery face so that the spirally wound electrode body 20 is sandwiched between the insulating plates 12 and 13.

At the open end of the battery can 11, a battery cover 14, and a safety valve mechanism 15 and a PTC (Positive Temperature Coefficient) device 16 provided inside the battery cover 14 are attached by being caulked with a gasket 17. Inside of the battery can 11 is thereby hermetically sealed. The battery cover 14 is made of, for example, a material similar to that of the battery can 11. The safety valve mechanism 15 is electrically connected to the battery cover 14 with the PTC device 16 in between. If the internal pressure of the battery becomes a certain level or more by internal short circuit, external heating or the like, a disk plate 15A flips to cut the electrical connection between the battery cover 14 and the spirally wound electrode body 20. When temperature rises, the PTC device 16 limits a current by increasing the resistance value to prevent abnormal heat generation by a large current. The gasket 17 is made of, for example, an insulating material and its surface is coated with asphalt.

For example, a center pin 24 is inserted in the center of the spirally wound electrode body 20. A cathode lead 25 made of aluminum (Al) or the like is connected to the cathode 21 of the spirally wound electrode body 20. An anode lead 26 made of nickel or the like is connected to the anode 22. The cathode lead 25 is electrically connected to the battery cover 14 by being welded to the safety valve mechanism 15. The anode lead 26 is welded and electrically connected to the battery can 11.

Figure 2:
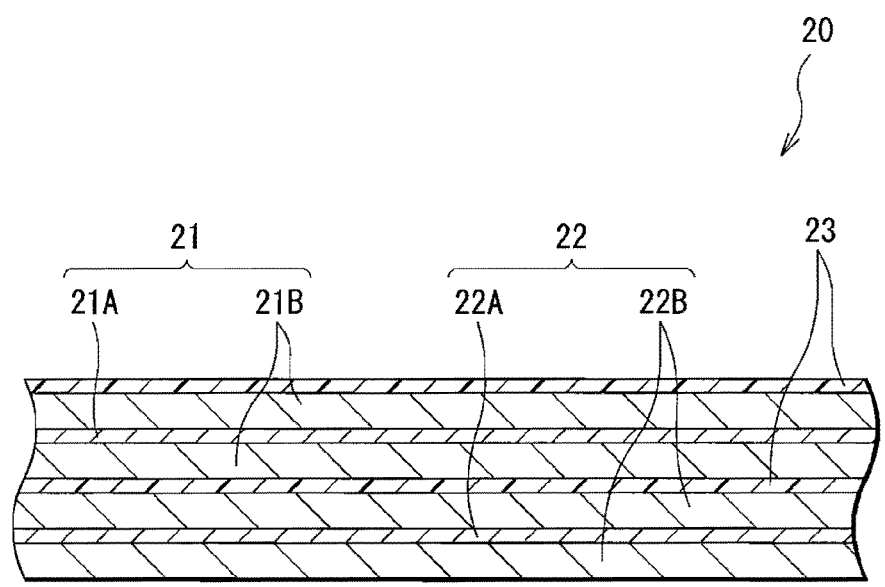
FIG. 2 is a cross sectional view illustrating an enlarged part of the spirally wound electrode body in the first secondary battery illustrated in FIG. 1.

FIG. 2 illustrates an enlarged part of the spirally wound electrode body 20 illustrated in FIG. 1. The cathode 21 has, for example, a structure in which a cathode active material layer 21B is provided on the both faces of a cathode current collector 21A. Though not illustrated, the cathode active material layer 21B may be provided on only a single face of the cathode current collector 21A. The cathode current collector 21A is made of, for example, a metal foil such as an aluminum foil, a nickel foil, and a stainless foil.

The cathode active material layer 21B contains, for example, as a cathode active material, one or more cathode materials capable of inserting and extracting lithium as an electrode reactant. As such a cathode material, for example, a lithium oxide, a lithium sulfide, an interlayer compound containing lithium, or a lithium-containing compound such as a lithium phosphate compound is included. Specially, a complex oxide containing lithium and a transition metal element or a phosphate compound containing lithium and a transition metal element is preferable. In particular, a compound containing at least one of cobalt (Co), nickel, manganese (Mn), iron, aluminum, vanadium (V), and titanium (Ti) as a transition metal element is preferable. The chemical formula thereof is expressed by, for example, $Li_xMIO_2$ or $Li_yMIIPO_4$. In the formula, MI and MII contain one or more transition metal elements. Values of x and y vary according to charge and discharge states of the battery, and are generally in the range of $0.05 \leq x \leq 1.10$ and $0.05 \leq y \leq 1.10$.

As the specific example of the complex oxide containing lithium and a transition metal element, a lithium-cobalt complex oxide ($Li_xCoO_2$), a lithium-nickel complex oxide ($Li_xNiO_2$), a lithium-nickel-cobalt complex oxide ($Li_xNi_{(1-z)}Co_zO_2$ (z<1)), a lithium-nickel-cobalt-manganese complex oxide ($Li_xNi_{(1-v-w)}Co_vMn_wO_2$ (v+w<1)), lithium-manganese complex oxide having a spinel structure ($LiMn_2O_4$) and the like are included. As a specific example of the phosphate compound containing lithium and a transition metal element, for example, lithium-iron phosphate compound ($LiFePO_4$), a lithium-iron-manganese phosphate compound ($LiFe_{1-u}Mn_uPO_4$ (u<1)) and the like are included.

As the cathode material capable of inserting and extracting lithium, further, other metal compound or a polymer material is included. As other metal compound, for example, an oxide such as titanium oxide, vanadium oxide, and manganese dioxide; and a disulfide such as titanium disulfide and molybdenum disulfide are included. As the polymer material, for example, polyaniline, polythiophene and the like are included.

The cathode active material layer 21B may contain an electrical conductor or a binder if necessary. As the electrical conductor, for example, a carbon material such as graphite, carbon black, and Ketjen black is included. One thereof is used singly, or two or more thereof are used by mixture. Further, in addition to the carbon material, a metal material, a conductive polymer material or the like may be used, as long as the material has electrical conductivity. As the binder, for example, a synthetic rubber such as styrene-butadiene rubber, fluorinated rubber, and ethylene propylene diene rubber, or a polymer material such as polyvinylidene fluoride is included. One thereof is used singly, or two or more thereof are used by mixture.

The anode 22 has, for example, a structure in which an anode active material layer 22B is provided on the both faces of an anode current collector 22A. Though not illustrated, the anode active material layer 22B may be provided on only a single face of the anode current collector 22A. The anode current collector 22A is made of, for example, a metal foil such as a copper foil, a nickel foil, and a stainless foil.

The anode active material layer 22B contains, as an anode active material, one or more carbon materials that are anode materials capable of inserting and extracting lithium as an electrode reactant. The anode active material layer 22B may further contain, for example, a binder like the cathode active material layer 21B if necessary. In particular, as the binder, polyvinylidene fluoride is desirably contained since thereby high lithium mobility is shown and superior cycle characteristics are obtained. As the carbon material, for example, graphite, non-graphitizable carbon, graphitizable carbon and the like are included. Such a carbon material is preferable, since a change in the crystal structure generated in charge and discharge is extremely small, and thus a higher charge and discharge capacity is obtained, and favorable charge and discharge cycle characteristics are thereby obtained. In particular, graphite is preferable since graphite has a large electrochemical equivalent and is able to provide a high energy density. As graphite, both natural graphite and artificial graphite are preferable.

In graphite, lattice spacing $d_{002}$ in the C-axis direction in X-ray diffraction is preferably in the range from 0.3350 nm to 0.3363 nm, both inclusive, since thereby a higher energy density is able to be obtained. The lattice spacing $d_{002}$ may be measured, for example, by X-ray diffraction method with the use of CuKα ray as X-ray and with the use of high purity silicon as a reference material ("Carbon fiber," Sugio Otani, pp. 733-742 (1986), Kindai hensyu).

The anode active material layer 22B further contains, as an anode active material, a lithium-containing compound expressed by Chemical formula 1. When the anode active material layer 22B contains such a lithium-containing material compound, a capacity lowering portion due to an irreversible capacity belonging to the carbon material is able to be compensated.

Chemical formula 1

In the formula, M is one or more transition metal elements, and a is a numerical value satisfying $0<a\leq0.8$.

The irreversible capacity herein means a capacity of lithium ions that is kept being inserted in the carbon material and not extracted in the next discharge process, and does not contribute to battery reaction out of lithium ions once inserted in the carbon material. Since the carbon material has the irreversible capacity, part of lithium ions supplied from the cathode active material to the anode active material in charge is not able to be returned to the cathode active material in the subsequent discharge. Thus, containing the lithium-containing compound of Chemical formula 1 compensates the irreversible capacity, and enables to use the inherent large theoretical capacity belonging to the carbon material at a maximum.

The average particle diameter in the lithium-containing compound of Chemical formula 1 is desirably 1 μm or less. If the particle diameter is excessively large, sufficient electron conductivity in the anode active material is not able to be obtained, and lowering of load characteristics and lowering of cycle characteristics are caused. The average particle diameter means a particle diameter when the number of cumulative particles to the entire number of particles becomes 50% when particle diameter distribution is measured.

Further, in particular, transition metal element M in the lithium-containing compound of Chemical formula 1 is preferably cobalt (Co). Thereby, a stable structure is obtained, and thus superior cycle characteristics are able to be obtained. Further, the content ratio of the lithium-containing compound of Chemical formula 1 in the anode active material is preferably 25 mass % or less. If the content ratio is excessively high, excessive lithium exists in the anode 22. Accordingly, a deactivated material not contributing the movement of lithium ions to the cathode 21 exists in the anode 22, resulting in lowering of the battery capacity.

The separator 23 separates the cathode 21 from the anode 22, prevents current short circuit due to contact of the both electrodes, and passes lithium ions. The separator 23 is made of, for example, a porous material made of a synthetic resin such as polytetrafluoroethylene, polypropylene, and polyethylene, or a ceramic porous material. The separator 23 may have a multi porous film structure in which two or more of the foregoing porous materials are mixed or layered. Specially, a polyolefin porous film is preferable, since such a film has a superior short circuit preventive effect and is able to improve battery safety by shutdown effect. In particular, polyethylene is preferable as a material composing the separator 23, since polyethylene provides shutdown effect at in the range from 100 deg C. to 160 deg C., both inclusive, and has superior electrochemical stability. Further, polypropylene is also preferable. In addition, as long as chemical stability is secured, a resin formed by copolymerizing or blending with polyethylene or polypropylene may be used.

An electrolytic solution is impregnated in the separator 23. The electrolytic solution contains, for example, a solvent and an electrolyte salt.

As the solvent, for example, an ambient temperature molten salt such as ethylene carbonate, propylene carbonate, butylene carbonate, dimethyl carbonate, diethyl carbonate, ethyl methyl carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, ethyl propionate, acetonitrile, glutaronitrile, adiponitrile, methoxyacetonitrile, 3-methoxypropionitrile, N,N-dimethylformamide, N-methylpyrrolidinone, N-methyloxazolidinone, nitromethane, nitroethane, sulfolane, dimethyl sulfoxide, trimethyl phosphate, ethylene sulfite, and bistrifluoromethylsulfonylimidetrimethylhexyl ammonium is included. One of the solvents may be used singly, or a plurality thereof may be used by mixture. Specially, at least one of ethylene carbonate, propylene carbonate, dimethyl carbonate, diethyl carbonate, and ethylmethyl carbonate is preferable, since a superior battery capacity, superior cycle characteristics, and superior storage characteristics are thereby able to be obtained. In this case, in particular, a mixture of a high viscosity (high dielectric constant) solvent (for example, specific inductive $\in\geq30$) such as ethylene carbonate and propylene carbonate and a low viscosity solvent (for example, viscosity≤1 mPa·s) such as dimethyl carbonate, ethylmethyl carbonate, and diethyl carbonate is preferable. Thereby, dissociation property of the electrolyte salt and ion mobility are improved, and thus higher effect is obtained.

As the electrolyte salt, for example, a lithium salt such as lithium hexafluorophosphate ($LiPF_6$), lithium bis(pentafluoroethanesulfonyl)imide ($Li(C_2F_5SO_2)_2N$), lithium perchlorate ($LiClO_4$), lithium hexafluoroarsenate ($LiAsF_6$), lithium tetrafluoroborate ($LiBF_4$), lithium trifluoromethanesulfonate ($LiSO_3CF_3$), lithium bis(trifluoromethanesulfonyl)imide ($Li(CF_3SO_2)_2N$), lithium tris(trifluoromethanesulfonyl)methyl ($LiC(SO_2CF_3)_3$), and lithium chloride (LiCl), and lithium bromide (LiBr) is included. One of the electrolyte salts may be used singly, or two or more thereof may be used by mixture. Specially, lithium hexafluorophosphate ($LiPF_6$) is preferably contained.

The content of the electrolyte salt is preferably in the range from 0.3 mol/kg to 3.0 mol/kg, both inclusive, to the solvent. If the content is out of the range, ion conductivity is extremely lowered, and thus there is a possibility that capacity characteristics and the like are not sufficiently obtained.

The secondary battery may be manufactured, for example, as follows.

First, the cathode 21 is formed by forming the cathode active material layer 21B on the cathode current collector 21A. A cathode active material, an electrical conductor, and a binder are mixed to prepare a cathode mixture, which is dispersed in a solvent such as N-methyl-2-pyrrolidone to obtain paste cathode mixture slurry. Subsequently, the cathode current collector 21A is coated with the cathode mixture slurry, and the solvent is dried. After that, the resultant is compression-molded by a rolling press machine or the like to form the cathode active material layer 21B. Otherwise, the cathode active material layer 21B may be formed by bonding the cathode mixture to the cathode current collector 21A.

Further, the anode 22 is formed by forming the anode active material layer 22B on the anode current collector 22A in the same manner as that of the cathode 21. The carbon material such as graphite and the lithium-containing compound of Chemical formula 1 as an anode active material and a binder such as polyvinylidene fluoride are mixed to prepare an anode mixture, which is dispersed in a solvent such as N-methyl-2-pyrrolidone to obtain paste anode mixture slurry. Subsequently, the anode current collector 22A is coated with the anode mixture slurry, and the solvent is dried. After that, the resultant is compression-molded by a rolling press machine or the like to form the anode active material layer 22B. Accordingly, the anode 22 is formed. Otherwise, the anode active material layer 22B may be formed by bonding the anode mixture to the anode current collector 22A.

Next, the cathode lead 25 is attached to the cathode current collector 21A by welding or the like, and the anode lead 26 is attached to the anode current collector 22A by welding or the like. After that, the cathode 21 and the anode 22 are spirally wound with the separator 23 in between. An end of the cathode lead 25 is welded to the safety valve mechanism 15, and an end of the anode lead 26 is welded to the battery can 11. The spirally wound cathode 21 and the spirally wound anode 22 are sandwiched between the pair of insulating plates 12 and 13, and contained in the battery can 11. After the cathode 21 and the anode 22 are contained in the battery can 11, the electrolytic solution is injected into the battery can 11 and impregnated in the separator 23. After that, at the open end of the battery can 11, the battery cover 14, the safety valve mechanism 15, and the PTC device 16 are fixed by being caulked with the gasket 17. The secondary battery illustrated in FIG. 1 is thereby completed.

In the secondary battery, when charged, for example, lithium ions are extracted from the cathode active material layer 21B and inserted in the anode active material layer 22B through the electrolytic solution. When discharged, for example, lithium ions are extracted from the anode active material layer 22B, and inserted in the cathode active material layer 21B through the electrolytic solution. At this time, the carbon material has an irreversible capacity, and thus part of lithium ions supplied from the cathode active material to the anode active material in charge is not able to be returned to the cathode active material in subsequent discharge. In this embodiment, however, the lithium-containing compound of Chemical formula 1 is contained in the anode active material layer 22B. Thus, the capacity lowering portion due to the irreversible capacity belonging to the carbon material is compensated. In this case, since the average particle diameter in the lithium-containing compound of Chemical formula 1 is 1 µm or less, sufficient electron conductivity in the anode 22 is obtained As described above, according to this embodiment, since the carbon material and the lithium-containing compound of Chemical formula 1 as an anode active material are contained in the anode active material layer 22B, the inherent large theoretical capacity belonging to the carbon material is able to be used at a maximum, a higher energy density is able to be obtained, and favorable cycle characteristics are also able to be obtained. In particular, since the average particle diameter in the lithium-containing compound of Chemical formula 1 is 1 µm or less, dispersion and reception characteristics of lithium ions in the anode 22 are able to be improved, and more superior cycle characteristics are obtained. Further, as the carbon material contained in the anode active material layer 22B, graphite in which the lattice spacing $d_{002}$ in the C-axis direction in X-ray diffraction is in the range from 0.3350 nm to 0.3363 nm, both inclusive, is used. Thereby, while dispersion and reception characteristics of lithium ions in the anode 22 are improved, the energy density is able to be further improved. Further, since the content of the lithium-containing compound of Chemical formula 1 in the anode active material is 25 mass % or less, lithium in the anode 22 is used without waste, which is advantageous to further improvement of the battery capacity.

Second Battery

Figure 3:
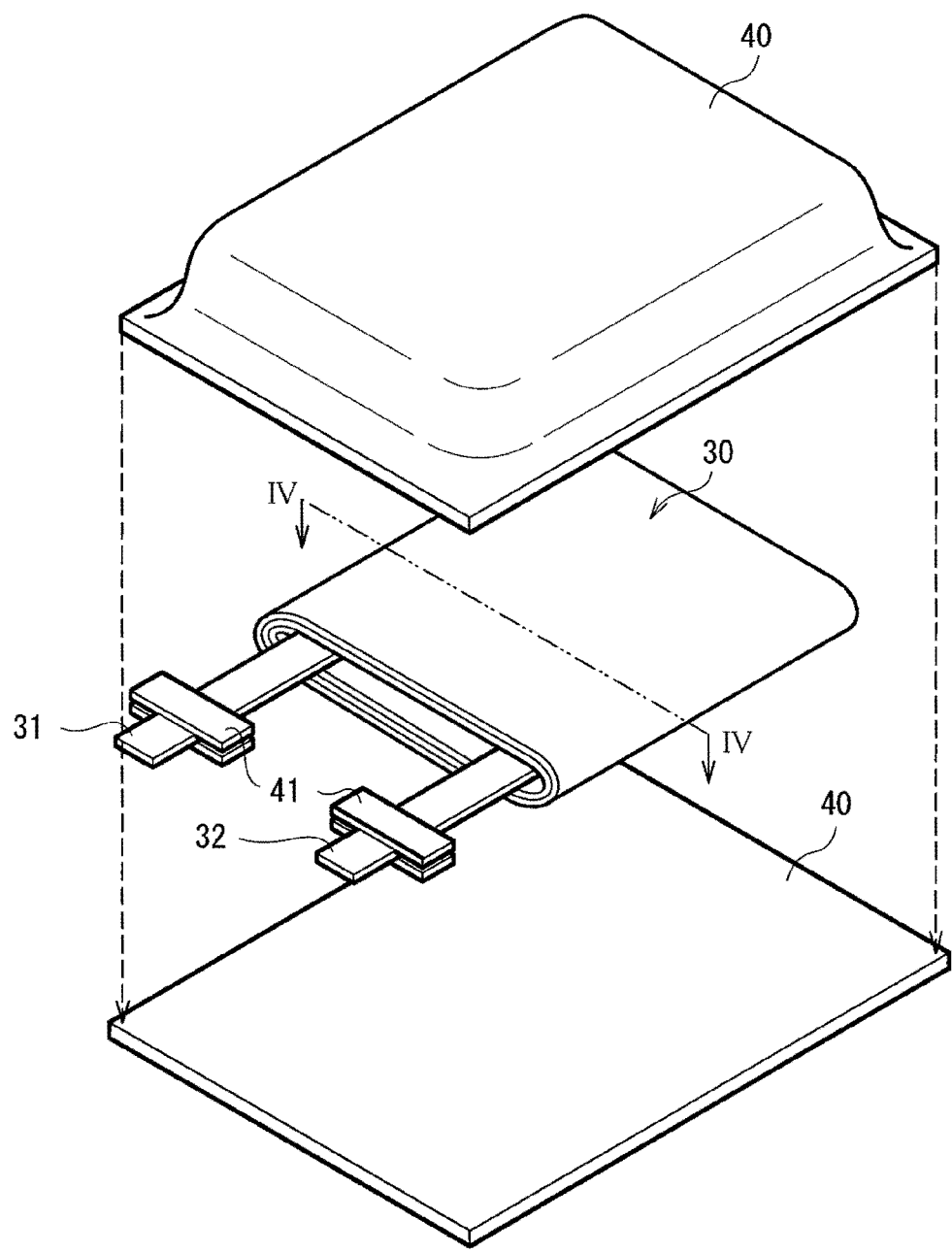
FIG. 3 is an exploded perspective view illustrating a structure of a second secondary battery according to the embodiment of the invention.

FIG. 3 illustrates an exploded perspective structure of a second secondary battery. In the battery, a spirally wound electrode body 30 to which a cathode lead 31 and an anode lead 32 are attached is contained in a film package member 40. The battery structure using the film package member 40 is called laminated film type.

The cathode lead 31 and the anode lead 32 are, for example, respectively derived in the same direction from inside to outside of the package member 40. The cathode lead 31 is made of, for example, a metal material such as aluminum. The anode lead 32 is made of, for example, a metal material such as copper, nickel, and stainless. The respective metal materials composing the cathode lead 31 and the anode lead 32 are in the shape of a thin plate or mesh.

The package member 40 is made of a rectangular aluminum laminated film in which, for example, a nylon film, an aluminum foil, and a polyethylene film are bonded together in this order. In the package member 40, for example, the polyethylene film and the spirally wound electrode body 30 are opposed to each other, and the respective outer edges are contacted to each other by fusion bonding or an adhesive. Adhesive films 41 to protect from entering of outside air are inserted between the package member 40 and the cathode lead 31, the anode lead 32. The adhesive film 41 is made of a material having contact characteristics to the cathode lead 31 and the anode lead 32, for example, a polyolefin resin such as polyethylene, polypropylene, modified polyethylene, and modified polypropylene.

The package member 40 may be made of a laminated film having other structure, a polymer film made of polypropylene or the like, or a metal film, instead of the foregoing 3-layer aluminum laminated film.

Figure 4:
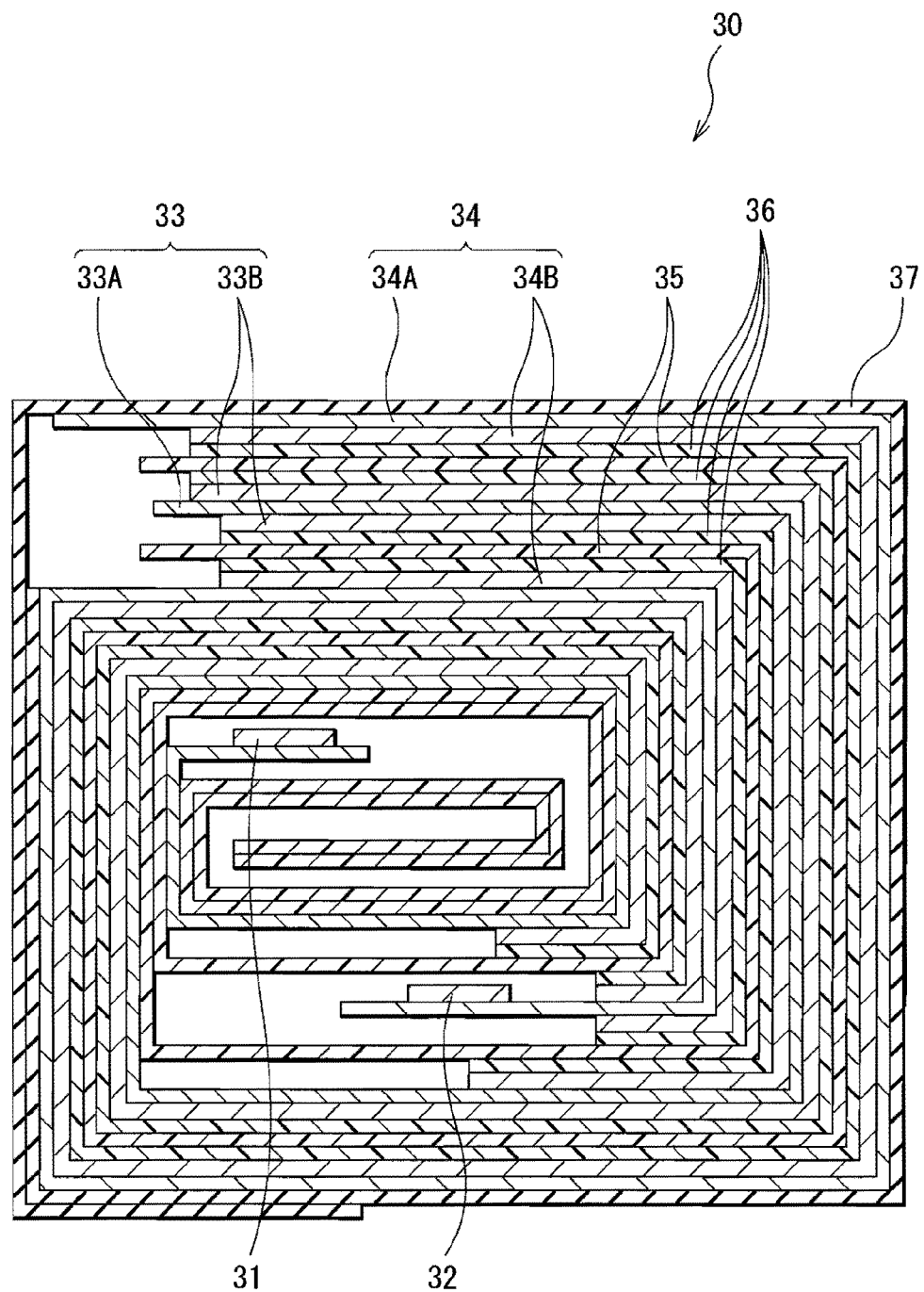
FIG. 4 is a cross sectional view illustrating a structure taken along line IV-IV of the spirally wound electrode body illustrated in FIG. 3.

FIG. 4 illustrates a cross sectional structure taken along line IV-IV of the spirally wound electrode body 30 illustrated in FIG. 3. In the spirally wound electrode body 30, a cathode 33 and an anode 34 are layered with a separator 35 and an electrolyte 36 in between and then spirally wound. The outermost periphery thereof is protected by a protective tape 37. Though FIG. 4 illustrates the simplified spirally wound electrode body 30, the spirally wound electrode body 30 actually has a flat (oval) cross section.

Figure 5:
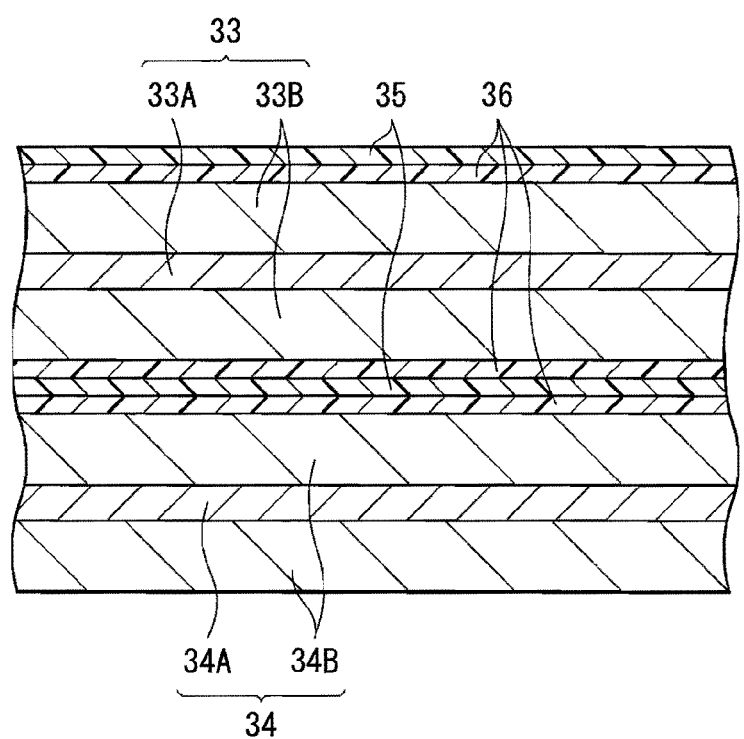
FIG. 5 is a cross sectional view illustrating an enlarged part of the spirally wound electrode body illustrated in FIG. 4.

FIG. 5 illustrates an enlarged part of the spirally wound electrode body 30 illustrated in FIG. 4. In the cathode 33, a cathode active material layer 33B is provided on the both faces of a cathode current collector 33A. The anode 34 has, for example, a structure similar to that of the anode illustrated in FIG. 1, that is, a structure in which an anode active material layer 34B is provided on the both faces of an anode current collector 34A. Structures of the cathode current collector 33A, the cathode active material layer 33B, the anode current collector 34A, the anode active material layer 34B, and the separator 35 are respectively similar to those of the cathode current collector 21A, the cathode active material layer 21B, the anode current collector 22A, the anode active material layer 22B, and the separator 23 in the foregoing first battery.

The electrolyte 36 is a so-called gel electrolyte, containing an electrolytic solution and a polymer compound that holds the electrolytic solution. The gel electrolyte is preferable, since a high ion conductivity (for example, 1 mS/cm or more at room temperature) is able to be thereby obtained, and leakage of the battery is able to be thereby prevented.

As the polymer compound, for example, an ether polymer compound such as polyethylene oxide and a cross-linked body containing polyethylene oxide, an ester polymer compound such as polymethacrylate or an acrylate polymer compound, or a polymer of vinylidene fluoride such as polyvinylidene fluoride and a copolymer of vinylidene fluoride and hexafluoropropylene is included. One thereof may be used singly, or a plurality thereof may be used by mixture. In particular, in terms of redox stability, the fluorinated polymer compound such as the polymer of vinylidene fluoride or the like is preferably used. The additive amount of the polymer compound in the electrolytic solution varies according to compatibility there between, but is preferably in the range from 5 mass % to 50 mass %, both inclusive, as an example. Further, in such a polymer compound, for example, it is desirable that the number average molecular weight is in the range from $5.0 \times 10^5$ to $7.0 \times 10^5$, both inclusive, or the weight average molecular weight is in the range from $2.1 \times 10^5$ to $3.1 \times 10^5$, both inclusive, and the inherent viscosity is in the range from 0.17 $(dm^3/g)$ to 0.21 $(dm^3/g)$, both inclusive.

The composition of the electrolytic solution is similar to the composition of the electrolytic solution in the foregoing first battery. However, the solvent in this case means a wide concept including not only the liquid solvent but also a solvent having ion conductivity capable of dissociating the electrolyte salt. Therefore, in the case where the polymer compound having ion conductivity is used, the polymer compound is also included in the solvent.

Instead of the electrolyte 36 in which the electrolytic solution is held by the polymer compound, the electrolytic solution may be directly used. In this case, the electrolytic solution is impregnated in the separator 35.

The secondary battery may be manufactured, for example, by the following three types of manufacturing methods.

In the first manufacturing method, first, the cathode 33 is formed by forming the cathode active material layer 33B on the both faces of the cathode current collector 33A by a procedure similar to that of the manufacturing method of the first battery. Further, the anode 34 is formed by forming the anode active material layer 34B on the both faces of the anode current collector 34A by a procedure similar to that of the manufacturing method of the first battery.

Subsequently, a precursor solution containing an electrolytic solution, a polymer compound, and a solvent is prepared. After the cathode 33 and the anode 34 are coated with the precursor solution, the solvent is volatilized to form the gel electrolyte 36. Subsequently, the cathode lead 31 and the anode lead 32 are respectively attached to the cathode current collector 33A and the anode current collector 34A. Subsequently, the cathode 33 and the anode 34 provided with the electrolyte 36 are layered with the separator 35 in between to obtain a laminated body. After that, the laminated body is spirally wound in the longitudinal direction, the protective tape 37 is adhered to the outermost periphery thereof to form the spirally wound electrode body 30. Subsequently, for example, after the spirally wound electrode body 30 is sandwiched between two pieces of the film package members 40, outer edges of the package members 40 are contacted by thermal fusion bonding or the like to enclose the spirally wound electrode body 30. At this time, the adhesive films 41 are inserted between the cathode lead 31, the anode lead 32 and the package member 40. Thereby, the secondary battery illustrated in FIG. 3 to FIG. 5 is completed.

In the second manufacturing method, first, the cathode lead 31 and the anode lead 32 are respectively attached to the cathode 33 and the anode 34. After that, the cathode 33 and the anode 34 are layered with the separator 35 in between and spirally wound. The protective tape 37 is adhered to the outermost periphery thereof, and thereby a spirally wound body as a precursor of the spirally wound electrode body 30 is formed. Subsequently, after the spirally wound body is sandwiched between two pieces of the film package members 40, the outermost peripheries except for one side are bonded by thermal fusion bonding or the like to obtain a pouched state, and the spirally wound body is contained in the pouch-like package member 40. Subsequently, a composition of matter for electrolyte containing an electrolytic solution, a monomer as a raw material for the polymer compound, a polymerization initiator, and if necessary other material such as a polymerization inhibitor is prepared, which is injected into the pouch-like package member 40. After that, the opening of the package member 40 is hermetically sealed by thermal fusion bonding or the like. Finally, the monomer is thermally polymerized to obtain a polymer compound. Thereby, the gel electrolyte 36 is formed. Accordingly, the secondary battery is completed.

In the third manufacturing method, the spirally wound body is formed and contained in the pouch-like package member 40 in the same manner as that of the foregoing first manufacturing method, except that the separator 35 with the both faces coated with a polymer compound is used. As the polymer compound with which the separator 35 is coated, for example, a polymer containing vinylidene fluoride as a component, that is, a homopolymer, a copolymer, a multicomponent copolymer and the like are included. Specifically, polyvinylidene fluoride, a binary copolymer containing vinylidene fluoride and hexafluoropropylene as a component, a ternary copolymer containing vinylidene fluoride, hexafluoropropylene, and chlorotrifluoroethylene as a component and the like are included. As a polymer compound, in addition to the foregoing polymer containing vinylidene fluoride as a component, another one or more polymer compounds may be used. Subsequently, an electrolytic solution is prepared and injected into the package member 40. After that, the opening of the package member 40 is sealed by thermal fusion bonding or the like. Finally, the resultant is heated while a weight is applied to the package member 40, and the separator 35 is contacted to the cathode 33 and the anode 34 with the polymer compound in between. Thereby, the electrolytic solution is impregnated into the polymer compound, and the polymer compound is gelated to form the electrolyte 36. Accordingly, the secondary battery is completed. In the third manufacturing method, the swollenness characteristics are improved compared to the first manufacturing method. Further, in the third manufacturing method, the monomer as a raw material of the polymer compound, the solvent and the like hardly remain in the electrolyte 36 compared to in the second manufacturing method, and the steps of forming the polymer compound are favorably controlled. Thus, sufficient contact characteristics are obtained between the cathode 33/the anode 34/the separator 35 and the electrolyte 36.

In the secondary battery, in the same manner as that of the first battery, lithium ions are inserted and extracted between the cathode 33 and the anode 34. That is, when charged, for example, lithium ions are extracted from the cathode 33 and inserted in the anode 34 through the electrolyte 36. Meanwhile, when discharged, lithium ions are extracted from the anode 34, and inserted in the cathode 33 through the electrolyte 36.

Actions and effects of the secondary battery and the method of manufacturing the secondary battery are similar to those of the foregoing first battery.

Third Battery

Figure 6:
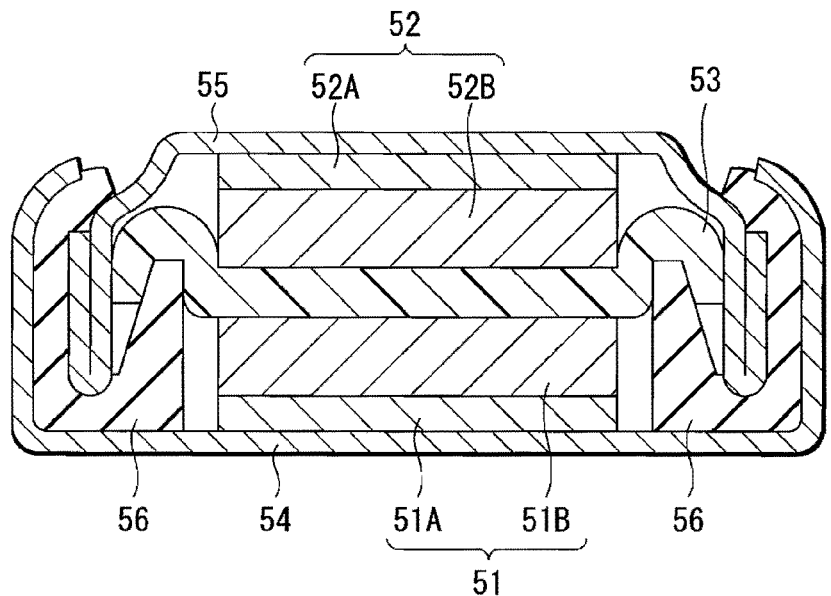
FIG. 6 is a cross sectional view illustrating a structure of a third secondary battery according to the embodiment of the invention.

FIG. 6 illustrates a cross sectional structure of a third secondary battery. In the secondary battery, a cathode 51 is bonded to a package can 54 and an anode 52 is contained in a package cup 55, the resultant is layered with a separator 53 impregnated with an electrolytic solution in between, and the resultant laminated body is caulked with a gasket 56. The battery structure using the package can 54 and the package cup 55 is so-called coin type.

The cathode 51 has a structure in which a cathode active material layer 51B is provided on a single face of a cathode current collector 51A. The anode 52 has a structure in which an anode active material layer 52B is provided on a single face of an anode current collector 52A. Structures of the cathode current collector 51A, the cathode active material layer 51B, the anode current collector 52A, the anode active material layer 52B, and the separator 53 are respectively similar to those of the cathode current collector 21A, the cathode active material layer 21B, the anode current collector 22A, the anode active material layer 22B, and the separator 23 in the foregoing first battery.

In the secondary battery, in the same manner as that of the first battery, lithium ions are inserted and extracted between the cathode 51 and the anode 52. That is, when charged, for example, lithium ions are extracted from the cathode 51 and inserted in the anode 52 through the electrolytic solution. Meanwhile, when discharged, lithium ions are extracted from the anode 52, and inserted in the cathode 51 through the electrolytic solution.

Actions and effects of the coin-type secondary battery and the method of manufacturing the coin-type secondary battery are similar to those of the foregoing first secondary battery.

EXAMPLES

A description will be given in detail of specific examples of the invention.

Example 1-1

First, lithium cobalt complex nitride ($Li_{2.6}Co_{0.4}N$) powder was formed as follows. Specifically, for example, commercially available reagent lithium nitride ($Li_3N$) powder and commercially available reagent metal cobalt powder were mixed at a given stoichiometric ratio, and the obtained mixture was pressure-formed. After that, the resultant was fired at 700 deg C. in the nitrogen atmosphere for 5 hours, and thereby a sintered body of lithium-containing complex nitride was obtained. For the sintered body, the crystal structure was examined by X-ray diffraction method. As a result, it was confirmed that almost all thereof was hexagonal $Li_{2.6}Co_{0.4}N$. The obtained sintered body of lithium cobalt complex nitride ($Li_{2.6}Co_{0.4}N$) was pulverized to obtain powder having an average particle diameter of 1 μm.

Next, an electrode containing the foregoing lithium cobalt complex nitride ($Li_{2.6}Co_{0.4}N$) and a carbon material as an active material was formed. Specifically, first, 95 mass % of a mixture obtained by mixing the foregoing lithium cobalt complex nitride ($Li_{2.6}Co_{0.4}N$) powder having an average particle diameter of 1 μm and a spherocrystal graphitized substance of mesophase spherule (MCMB) powder having an average particle diameter of 25 μm as a carbon material at a weight ratio of 1:99 and 5 mass % of polyvinylidene fluoride as a binder were mixed. Then, the resultant mixture was dispersed in N-methyl-2-pyrrolidone as a solvent to obtain mixture slurry. In the MCMB powder used as a carbon material, the lattice spacing $d_{002}$ in the C-axis direction calculated by X-ray diffraction was 0.3356 nm. Next, a current collector made of a copper foil being 15 μm thick was uniformly coated with the mixture slurry, which was dried. The resultant was compression-molded so that the volume density became 1.80 $g/cm^3$ to form an active material layer. Thereby, the electrode was obtained.

Figure 7:
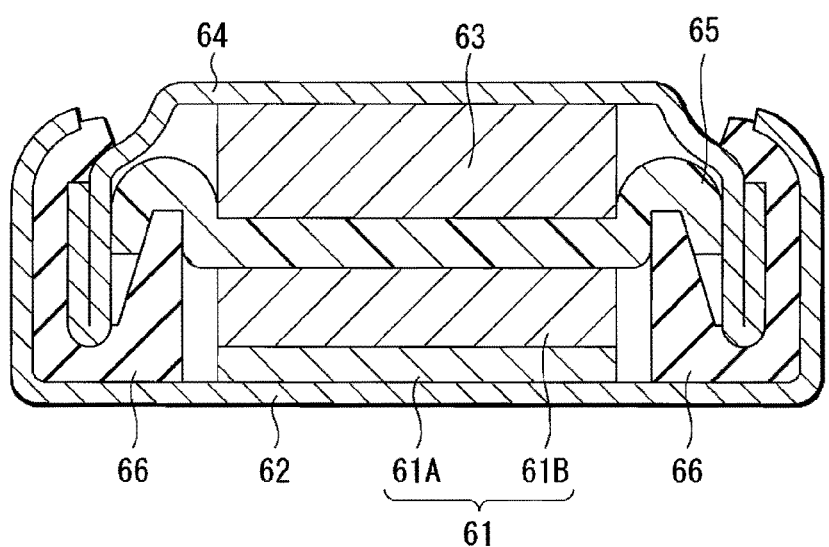
FIG. 7 is a cross sectional view illustrating a structure of a test cell used in examples of the invention.

Next, with the use of the electrode, a coin-type test cell with a diameter of 20 mm and a thickness of 1.6 mm having the structure illustrated in FIG. 7 was formed. In the test cell, the foregoing electrode obtained as a pellet having a diameter of 16 mm was used as a test electrode 61, the test electrode 61 was contained in a package can 62, a counter electrode 63 was bonded to a package cup 64, and the resultant was layered with a separator 65 impregnated with an electrolytic solution in between, and then the resultant laminated body was caulked with a gasket 66. That is, in the test electrode 61, an active material layer 61B containing the lithium cobalt complex nitride ($Li_{2.6}Co_{0.4}N$) and MCMB was provided on a current collector 61A made of a copper foil, and the active material layer 61B was arranged oppositely to the counter electrode 63 with the separator 65 in between. In that case, as the counter electrode 63, lithium metal was used. As the separator 65, a polyethylene porous film was used. As the electrolytic solution, a solution in which $LiPF_6$ as an electrolyte salt was mixed in a mixed solvent obtained by mixing ethylene carbonate (EC), diethyl carbonate (DEC), propylene carbonate (PC), and vinyl ethylene carbonate (VEC) at a mass ratio of 50:30:17:3 was used. The content of $LiPF_6$ was set to 1.0 mol/kg to the mixed solvent.

The cylindrical secondary battery including the anode 22 and the cathode 21 illustrated in FIG. 1 was formed. The anode 22 was formed as follows. The both faces of the anode current collector 22A made of a strip-shaped copper foil being 15 μm thick were uniformly coated with the mixture slurry obtained in the same manner as that used for the foregoing electrode, which was dried. The resultant was compression-molded by a roll pressing machine or the like so that the volume density became 1.80 $g/cm^3$ to form the anode active material layer 22B, and the anode lead 26 was attached to one end of the anode current collector 22A. The thickness of a single face of the anode active material layer 22B was 80 μm.

The cathode 21 was formed as follows. Specifically, first, lithium carbonate ($Li_2CO_3$) and cobalt carbonate ($CoCO_3$) were mixed at a molar ratio of $Li_2CO_3$: $CoCO_3$=0.5:1. The mixture was fired in the air at 900 deg C. for 5 hours. Thereby, lithium cobalt complex oxide ($LiCoO_2$) was obtained. When the obtained $LiCoO_2$ was analyzed by X-ray diffraction method, the obtained peak well corresponded with the peak of $LiCoO_2$ registered in Joint Committee of Powder Diffraction Standard (JCPDS) file. Next, the lithium cobalt complex oxide was pulverized into powder in which the cumulative 50% particle diameter obtained by laser diffraction method was 15 μm as a cathode active material.

Subsequently, 95 mass % of the lithium cobalt complex oxide powder and 5 mass % of lithium carbonate powder ($Li_2CO_3$) powder were mixed. 94 mass % of the resultant mixture, 3 mass % of Ketjen black as an electrical conductor, and 3 mass % of polyvinylidene fluoride as a binder were mixed. The resultant mixture was dispersed in N-methyl-2-pyrrolidone as a solvent to obtain cathode mixture slurry. Next, the both faces of the cathode current collector 21A made of a strip-shaped aluminum foil being 20 μm thick were uniformly coated with the cathode mixture slurry, which was dried. After that, the resultant was compression-molded by a roll pressing machine to form the cathode active material layer 21B. Accordingly, the cathode 21 was formed. The thickness of a single face of the cathode active material layer 21B was 80 μm, and the volume density was 3.55 g/cm³. After that, the cathode lead 25 made of aluminum was attached to one end of the cathode current collector 21A. At that time, the secondary battery was formed as a lithium ion secondary battery in which the capacity of the anode 22 was expressed based on insertion and extraction of lithium. That is, each thickness of the cathode active material layer 21B and the anode active material layer 22B was respectively adjusted so that lithium was not precipitated on the anode 22 even when fully charged.

After the cathode 21 and the anode 22 were respectively formed, the cathode 21 and the anode 22 were layered with the separator 23 made of a microporous polyethylene stretched film being 20 μm thick in between. Then, the anode 22, the separator 23, the cathode 21, and the separator 23 were layered in this order. The resultant laminated body was spirally wound several times to form the spirally wound electrode body 20 in the shape of a jelly roll. Next, the spirally wound electrode body 20 was sandwiched between the pair of insulating plates 12 and 13, the anode lead 26 was welded to the battery can 11, the cathode lead 25 was welded to the safety valve mechanism 15, and the spirally wound electrode body 20 was contained in the battery can 11. Subsequently, an electrolytic solution was injected into the battery can 11 by depressurization method or the like, and impregnated in the separator 23. After that, the battery cover 14 was fixed to the battery can 11 by caulking with the gasket 17. Thereby, the cylindrical secondary battery being 18 mm in outer diameter and 65 mm in height was fabricated.

As the electrolytic solution, a solution obtained by dissolving $LiPF_6$ as an electrolyte salt in a mixed solvent of ethylene carbonate (EC), diethyl carbonate (DEC), propylene carbonate (PC), and vinylethylene carbonate (VEC) at a mass ratio of 50:30:17:3 was used. The content of $LiPF_6$ was set to 1.0 mol/kg to the mixed solvent.

Examples 1-2 to 1-4

Test cells (FIG. 7) and secondary batteries (FIG. 1) were fabricated in the same manner as that of Example 1-1, except that the average particle diameter of lithium cobalt complex nitride ($Li_{2.6}Co_{0.4}N$) in the (anode) active material layer was respectively changed as shown in the following Table 1.

Further, as Comparative examples 1-1 and 1-2, test cells (FIG. 7) and secondary batteries (FIG. 1) were fabricated in the same manner as that of Example 1-1, except that the average particle diameter of the lithium cobalt complex nitride ($Li_{2.6}Co_{0.4}N$) in the (anode) active material layer was respectively changed as shown in the following Table 1. Further, as Comparative example 1-3, a test cell (FIG. 7) and a secondary battery (FIG. 1) were fabricated in the same manner as that of Example 1-1, except that the lithium-containing compound was not contained in the (anode) active material layer.

For the test cells (FIG. 7) of the respective examples and the respective comparative examples formed as above, the discharge capacity (mA/g) and the initial charge and discharge efficiency were examined. The specific procedure thereof was as follows. First, for the test cell, constant current charge was performed at a constant current of 1 C until the equilibrium potential reached 0 V to lithium. Further, constant voltage charge was performed at a constant voltage of 0 V until the total time from starting the constant current charge reached four hours. After that, discharge was performed at a constant current of 1 C until the equilibrium potential reached 1.5 V to lithium, and the discharge capacity (mAh/g) per unit weight of a result obtained by subtracting the mass of the copper foil current collector and the binder from the mass of the test electrode 61 was measured. 1 C is a current value at which the theoretical capacity is completely discharged in 1 hour. The discharge capacity calculated as above was based on the equilibrium potential, and thus the discharge capacity reflected characteristics inherent to the material composing the active material layer of the test electrode 61. Charge herein means lithium insertion reaction to the active material layer 61B.

Further, the initial charge and discharge efficiency was obtained as follows. Constant current charge was performed at a constant current of 1 C until the battery voltage reached 0 V. After that, constant voltage charge was performed at a constant voltage of 0 V until the total time from starting the constant current charge reached 4 hours. Subsequently, constant current discharge was performed at a constant current of 1 C until the battery voltage reached 1.5 V. Then, a retention ratio of the initial discharge capacity to the initial charge capacity, that is, (initial discharge capacity/initial charge capacity)×100(%) was obtained as the initial charge and discharge efficiency. Results of the obtained discharge capacity (mAh/g) and the initial charge and discharge efficiency are shown in Table 1.

Figure 8:
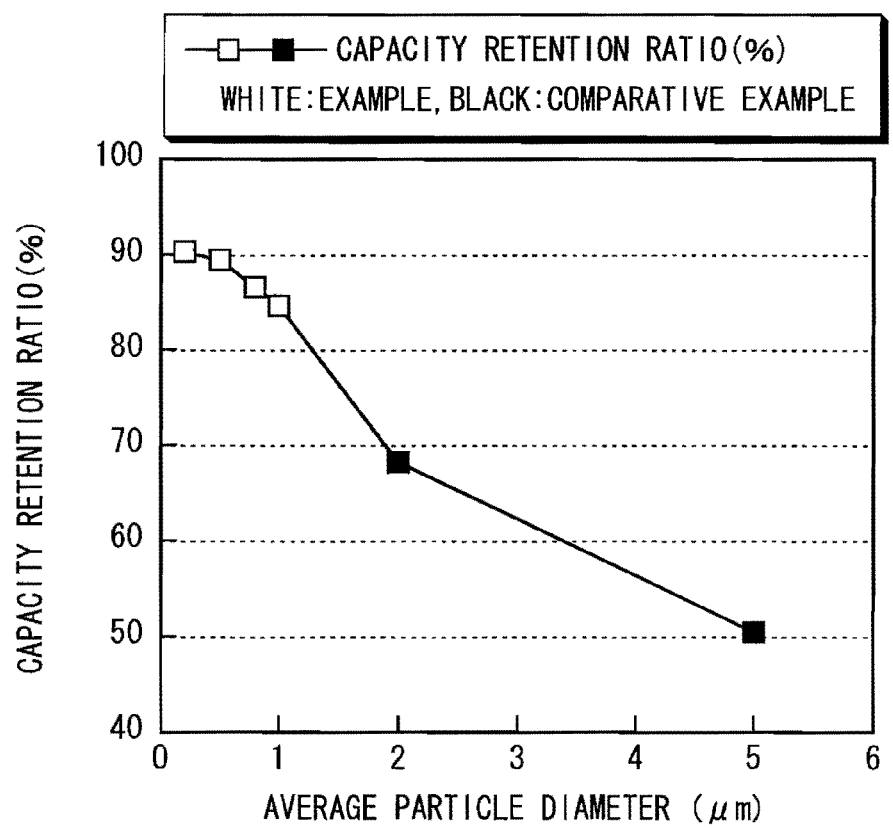
FIG. 8 is a characteristics diagram illustrating a relation between an average particle diameter of a lithium-containing compound and a capacity retention ratio in examples of the invention.

For the secondary batteries (FIG. 1) of the respective examples and the respective comparative examples, charge and discharge were performed, and the battery capacity and the cycle characteristics (capacity retention ratio) were examined. Charge was performed at a constant current of 1 C until the battery voltage reached 4.2 V, and then charge was performed at a constant voltage of 4.2 V until the total charge time reached 4 hours. Discharge was performed at a constant current of 1 C until the battery voltage reached 2.5 V. The battery capacity was the initial discharge capacity (discharge capacity at the first cycle). The cycle characteristics (capacity retention ratio) were a ratio of the discharge capacity at the 100th cycle to the initial discharge capacity (discharge capacity at the first cycle), that is, (discharge capacity at the 100th cycle/discharge capacity at the first cycle)×100(%). Results of the battery capacity and the cycle characteristics (capacity retention ratio) are shown in Table 1. FIG. 8 illustrates a relation between an average particle diameter of the lithium cobalt complex nitride ($Li_{2.6}Co_{0.4}N$) and cycle characteristics (capacity retention ratio).

TABLE 1

Carbon material: spherocrystal graphitized substance of mesophase spherule (MCMB)
Lithium-containing compound: $Li_{2.6}Co_{0.4}N$
Binder: PVdF

| | MCMB lattice spacing $d_{002}$ (μm) | Lithium-containing compound | | Discharge capacity (mAh/g) | Initial charge and discharge efficiency (%) | Battery capacity (mAh) | Capacity retention ratio (%) |
| | | Average particle diameter (μm) | Content ratio (mass %) | | | | |
|---|---|---|---|---|---|---|---|
| Comparative example 1 | 0.3356 | 5.0 | 1.0 | 367 | 88.6 | 2176 | 50.5 |
| Comparative example 2 | 0.3356 | 2.0 | 1.0 | 367 | 88.5 | 2175 | 68.2 |
| Example 1-1 | 0.3356 | 1.0 | 1.0 | 367 | 88.5 | 2176 | 84.6 |
| Example 1-2 | 0.3356 | 0.8 | 1.0 | 367 | 88.4 | 2176 | 86.6 |
| Example 1-3 | 0.3356 | 0.5 | 1.0 | 367 | 88.3 | 2176 | 89.4 |
| Example 1-4 | 0.3356 | 0.2 | 1.0 | 367 | 88.0 | 2175 | 90.3 |
| Comparative example 1-3 | 0.3356 | — | — | 363 | 86.8 | 2141 | 73.5 |

As shown in Table 1, in Examples 1-1 to 1-4, for all items of the discharge capacity and the initial charge and discharge efficiency in the test cell; the discharge capacity and the capacity retention ratio in the secondary battery, superior values were obtained compared to those of Comparative example 1-3 not containing the lithium-containing compound. Further, in Examples 1-1 to 1-4, compared to Comparative examples 1-1 and 1-2 containing the lithium cobalt complex nitride ($Li_{2.6}Co_{0.4}N$) having a higher average particle diameter, a higher capacity retention ratio was obtained while a battery capacity almost equal to those of Comparative examples 1-1 and 1-2 was retained as shown in FIG. 8. In FIG. 8, a white square represents the examples and a black square represents the comparative examples. From the results, it was confirmed that in the case where the lithium cobalt complex nitride ($Li_{2.6}Co_{0.4}N$) having an average particle diameter of 1.0 μm or less was contained as the (anode) active material, superior battery characteristics were obtained.

Examples 2-1 to 2-6

Test cells (FIG. 7) and secondary batteries (FIG. 1) were fabricated in the same manner as that of Example 1-1, except that the lattice spacing $d_{002}$ in the C-axis direction in the MCMB powder as a carbon material used for the (anode) active material layer was respectively changed as shown in the following Table 2.

As Comparative examples 2-1 to 2-6, test cells (FIG. 7) and secondary batteries (FIG. 1) were fabricated in the same manner as that of Examples 2-1 to 2-6, except that the lithium-containing material was not contained in the (anode) active material layer.

Figure 9:
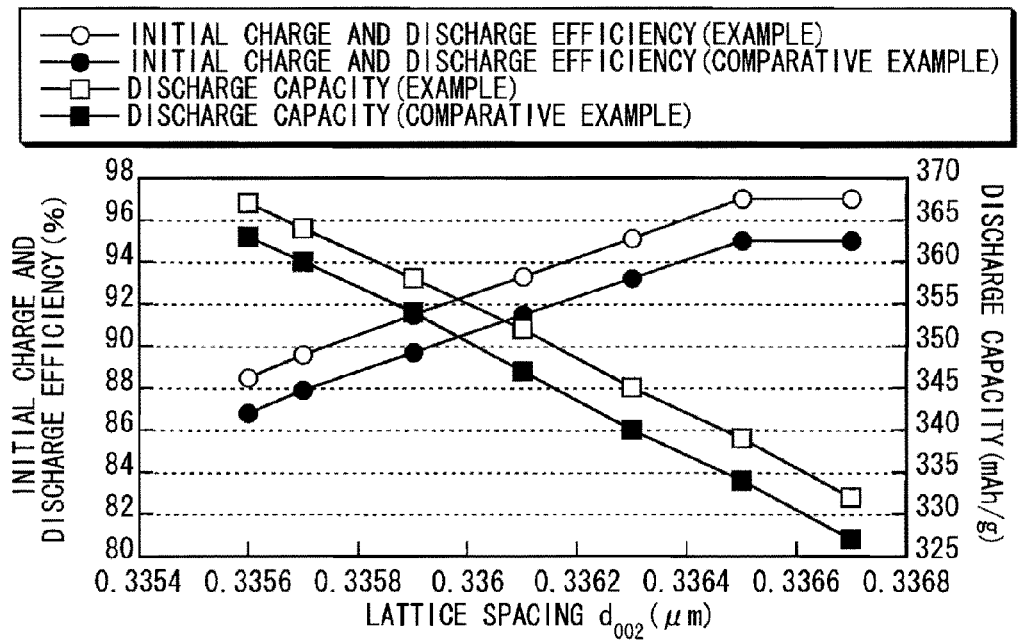
FIG. 9 is a characteristics diagram illustrating a relation between a lattice spacing $d_{002}$ of MCMB and an initial charge and discharge efficiency/a discharge capacity in examples of the invention.
Figure 10:
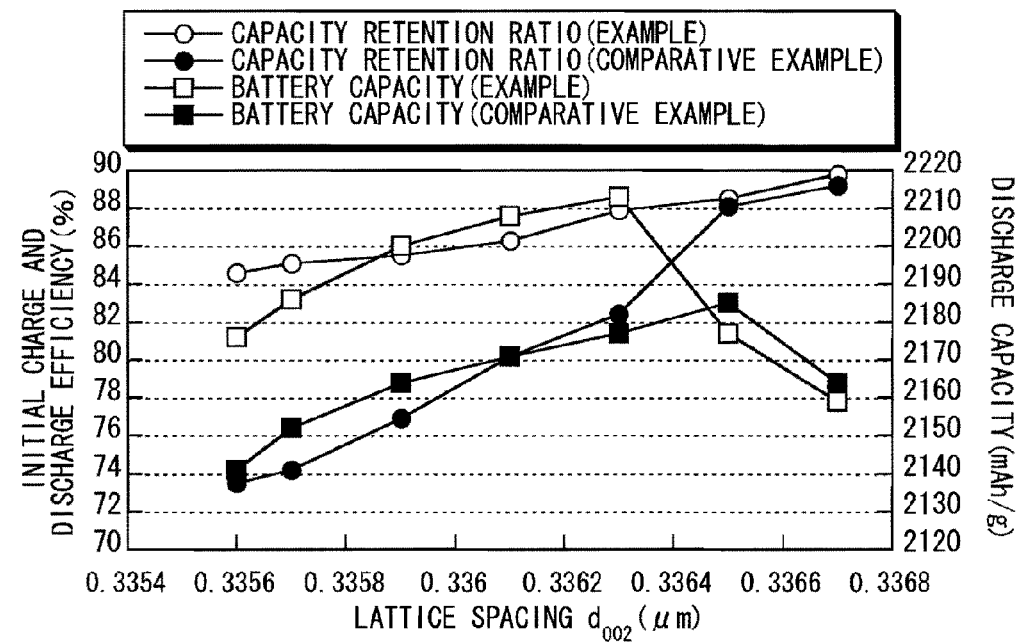
FIG. 10 is a characteristics diagram illustrating a relation between a lattice spacing $d_{002}$ of the MCMB and a capacity retention ratio/a battery capacity in the examples of the invention.

For the test cells (FIG. 7) and the secondary batteries (FIG. 1) of Examples 2-1 to 2-6 and Comparative examples 2-1 to 2-6, respective items of the discharge capacity, the initial charge and discharge efficiency, the battery capacity, and the capacity retention ratio were examined in the same manner as that of Example 1-1. The results are shown in Table 2, FIG. 9, and FIG. 10 together with the results of Example 1-1 and Comparative example 1-1. FIG. 9 illustrates a relation between a lattice spacing $d_{002}$ in the C-axis direction of the carbon material (MCMB) and an initial charge and discharge efficiency/a discharge capacity. FIG. 10 illustrates a relation between a lattice spacing $d_{002}$ in the C-axis direction of the carbon material (MCMB) and a capacity retention ratio/a battery capacity.

TABLE 2

Carbon material: spherocrystal graphitized substance of mesophase spherule (MCMB)
Lithium-containing compound: $Li_{2.6}Co_{0.4}N$
Binder: PVdF

| | MCMB lattice spacing $d_{002}$ (μm) | Lithium-containing compound | | Discharge capacity (mAh/g) | Initial charge and discharge efficiency (%) | Battery capacity (mAh) | Capacity retention ratio (%) |
| | | Average particle diameter (μm) | Content ratio (mass %) | | | | |
|---|---|---|---|---|---|---|---|
| Example 1-1 | 0.3356 | 1.0 | 1.0 | 367 | 88.5 | 2176 | 84.6 |
| Example 2-1 | 0.3357 | 1.0 | 1.0 | 364 | 89.6 | 2186 | 85.1 |
| Example 2-2 | 0.3359 | 1.0 | 1.0 | 358 | 91.5 | 2200 | 85.5 |
| Example 2-3 | 0.3361 | 1.0 | 1.0 | 352 | 93.3 | 2208 | 86.3 |
| Example 2-4 | 0.3363 | 1.0 | 1.0 | 345 | 95.1 | 2213 | 87.9 |
| Example 2-5 | 0.3365 | 1.0 | 1.0 | 339 | 97.0 | 2177 | 88.5 |
| Example 2-6 | 0.3367 | 1.0 | 1.0 | 332 | 97.0 | 2159 | 89.8 |
| Comparative example 1-1 | 0.3356 | — | — | 363 | 86.8 | 2141 | 73.5 |
| Comparative example 2-1 | 0.3357 | — | — | 360 | 87.9 | 2152 | 74.2 |

TABLE 2-continued

Carbon material: spherocrystal graphitized substance of mesophase spherule (MCMB)
Lithium-containing compound: $Li_{2.6}Co_{0.4}N$
Binder: PVdF

|  | MCMB lattice spacing $d_{002}$ (μm) | Lithium-containing compound Average particle diameter (μm) | Content ratio (mass %) | Discharge capacity (mAh/g) | Initial charge and discharge efficiency (%) | Battery capacity (mAh) | Capacity retention ratio (%) |
|---|---|---|---|---|---|---|---|
| Comparative example 2-2 | 0.3359 | — | — | 354 | 89.7 | 2164 | 76.9 |
| Comparative example 2-3 | 0.3361 | — | — | 347 | 91.5 | 2171 | 80.2 |
| Comparative example 2-4 | 0.3363 | — | — | 340 | 93.2 | 2177 | 82.4 |
| Comparative example 2-5 | 0.3365 | — | — | 334 | 95.0 | 2185 | 88.1 |
| Comparative example 2-6 | 0.3367 | — | — | 327 | 95.0 | 2164 | 89.2 |

As shown in Table 2, based on comparison between Examples 2-1 to 2-6 and Comparative examples 2-1 to 2-6, in the case where the MCMB powder had an identical lattice spacing $d_{002}$, the discharge capacity and the initial charge and discharge efficiency in the test cell; and the capacity retention ratio in the secondary battery were improved when the lithium-containing compound was contained as an (anode) active material. Further, there was a tendency that the larger the lattice spacing $d_{002}$ was, the lower the discharge capacity was, but the larger the lattice spacing $d_{002}$ was, the higher the charge and discharge efficiency, the battery capacity, and the capacity retention ratio was as illustrated in FIG. 9 and FIG. 10. However, as shown in Examples 2-6 and 2-7, when the lattice spacing $d_{002}$ exceeded 0.3363, the initial charge and discharge efficiency was excessively high. Thus, in that case, lithium ions not contributing to charge and discharge remained in the test electrode 61 (anode 22), and as a result, the battery capacity was lowered by the portion occupied by a useless active material in the battery.

Examples 3-1 to 3-8

Test cells (FIG. 7) and secondary batteries (FIG. 1) were fabricated in the same manner as that of Example 1-1, except that the content ratio (mass %) of the lithium cobalt complex nitride ($Li_{2.6}Co_{0.4}N$) existing in the (anode) active material was respectively changed as shown in the following Table 3.

Figure 11:
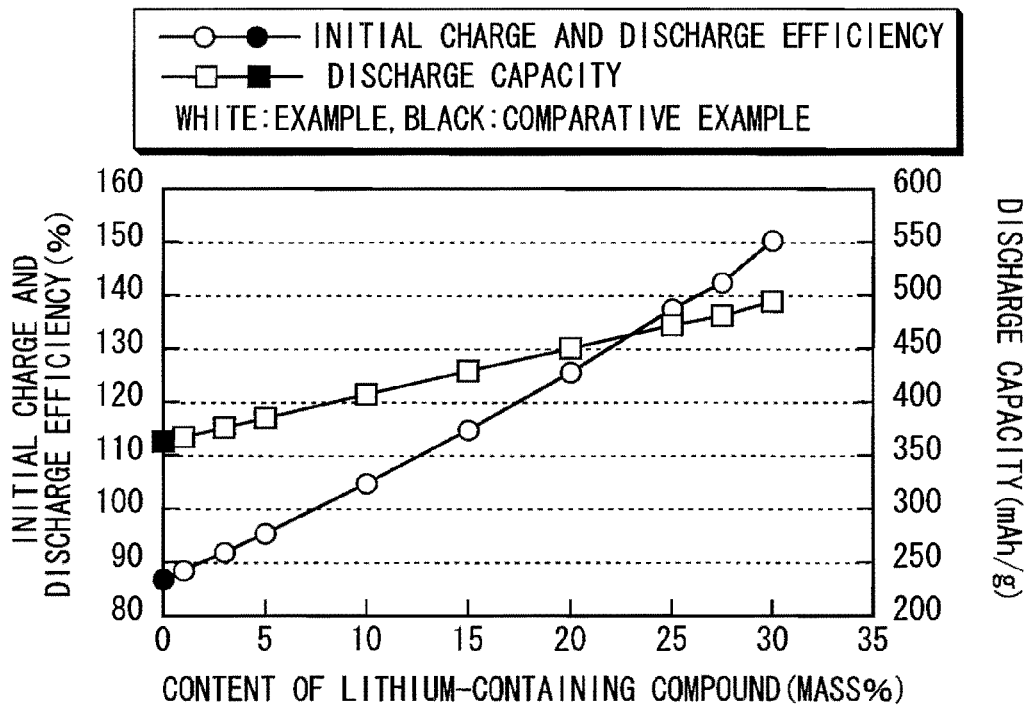
FIG. 11 is a characteristics diagram illustrating a relation between a content of a lithium-containing compound in an anode active material and an initial charge and discharge efficiency/a discharge capacity in examples of the invention.
Figure 12:
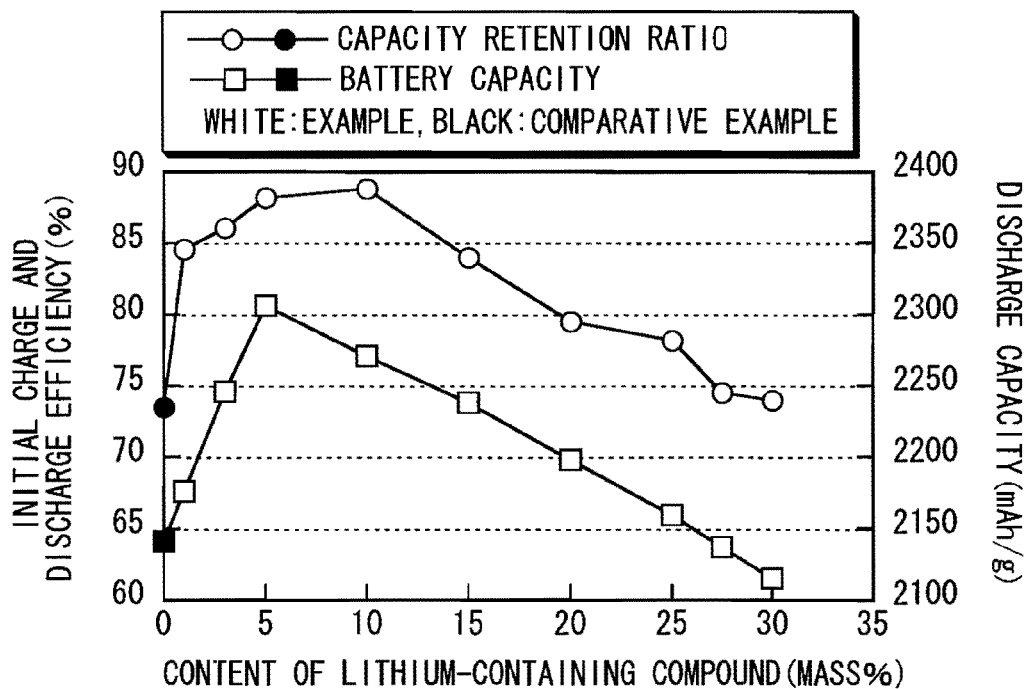
FIG. 12 is a characteristics diagram illustrating a relation between a content ratio of the lithium-containing compound in the anode active material and a capacity retention ratio/a battery capacity in the examples of the invention.

For the test cells (FIG. 7) and the secondary batteries (FIG. 1) of Examples 3-1 to 3-8, respective items of the discharge capacity, the initial charge and discharge efficiency, the battery capacity, and the capacity retention ratio were examined in the same manner as that of Example 1-1. The results are shown in Table 3, FIG. 11, and FIG. 12 together with the results of Example 1-1 and Comparative example 1-1. FIG. 11 illustrates a relation between a content of $Li_{2.6}Co_{0.4}N$ in the (anode) active material and an initial charge and discharge efficiency/a discharge capacity. FIG. 12 illustrates a relation between a content ratio of $Li_{2.6}Co_{0.4}N$ in the (anode) active material and a capacity retention ratio/a battery capacity.

TABLE 3

Carbon material: spherocrystal graphitized substance of mesophase spherule (MCMB)
Lithium-containing compound: $Li_{2.6}Co_{0.4}N$
Binder: PVdF

|  | MCMB lattice spacing $d_{002}$ (μm) | Lithium-containing compound Average particle diameter (μm) | Content ratio (mass %) | Discharge capacity (mAh/g) | Initial charge and discharge efficiency (%) | Battery capacity (mAh) | Capacity retention ratio (%) |
|---|---|---|---|---|---|---|---|
| Comparative example 1-1 | 0.3356 | — | — | 363 | 86.8 | 2141 | 73.5 |
| Example 1-1 | 0.3356 | 1.0 | 1.0 | 367 | 88.5 | 2176 | 84.6 |
| Example 3-1 | 0.3356 | 1.0 | 3.0 | 376 | 91.9 | 2246 | 86.1 |
| Example 3-2 | 0.3356 | 1.0 | 5.0 | 385 | 95.4 | 2306 | 88.2 |
| Example 3-3 | 0.3356 | 1.0 | 10.0 | 407 | 104.7 | 2271 | 88.8 |
| Example 3-4 | 0.3356 | 1.0 | 15.0 | 429 | 114.7 | 2238 | 84.0 |
| Example 3-5 | 0.3356 | 1.0 | 20.0 | 450 | 125.6 | 2198 | 79.5 |
| Example 3-6 | 0.3356 | 1.0 | 25.0 | 472 | 137.4 | 2159 | 78.2 |
| Example 3-7 | 0.3356 | 1.0 | 27.5 | 481 | 142.4 | 2137 | 74.5 |
| Example 3-8 | 0.3356 | 1.0 | 30.0 | 494 | 150.3 | 2115 | 74.0 |

As shown in Table 3, in the test cells of Examples 3-1 to 3-8, it was found that a higher discharge capacity and a higher initial charge and discharge efficiency were shown compared to those of Comparative example 1-1. In addition, it was found that the higher the content ratio of the lithium cobalt complex nitride ($Li_{2.6}Co_{0.4}N$) existing in the (anode) active material was, the higher the discharge capacity and the initial charge and discharge efficiency was as illustrated in FIG. 11. Further, it was found that the battery capacity and the capacity retention ratio in the secondary battery were the maximum in the case where the content ratio of the lithium cobalt complex nitride ($Li_{2.6}Co_{0.4}N$) was in the range from 5 to 10 mass %, and were lowered in the case where the content ratio was above the foregoing range as illustrated in FIG. 12. The battery capacity was lowered because a useless active material occupied the inside of the battery by the excessively high initial charge and discharge efficiency. The capacity retention ratio was lowered since the lithium cobalt complex nitride ($Li_{2.6}Co_{0.4}N$) excessively existed, electron conductivity in the (anode) active material was lowered, and diffusion characteristics and reception characteristics of lithium ions were lowered.

Example 4-1

A test cell (FIG. 7) and a secondary battery (FIG. 1) were fabricated in the same manner as that of Example 1-1, except that styrene-butadiene rubber (SBR) was used instead of polyvinylidene fluoride as a binder used for the (anode) active material layer. Further, as Comparative example 4-1 thereto, a test cell (FIG. 7) and a secondary battery (FIG. 1) were fabricated in the same manner as that of Example 4-1, except that the lithium-containing compound was not contained in the (anode) active material layer.

For the test cells (FIG. 7) and the secondary batteries (FIG. 1) of Example 4-1 and Comparative example 4-1, respective items of the discharge capacity, the initial charge and discharge efficiency, the battery capacity, and the capacity retention ratio were examined in the same manner as that of Example 1-1. The results are shown in Table 4 together with the results of Example 1-1 and Comparative example 1-1.

As shown in Table 4, in Example 4-1 using styrene-butadiene rubber (SBR) as a binder, for all items of the discharge capacity and the initial charge and discharge efficiency in the test cell; and the battery capacity and the capacity retention ratio in the secondary battery, superior values were also obtained compared to those of Comparative example 4-1 not containing the lithium-containing compound. However, in Example 4-1, in particular, the capacity retention ratio showed the lower value than that of Example 1-1. The reason thereof may be as follows. That is, since the swelling characteristics of the solvent of the electrolytic solution to styrene-butadiene rubber were lower than the swelling characteristics of the solvent of the electrolytic solution to polyvinylidene fluoride, the permeability of lithium ions were inferior.

Examples 5-1 and 5-2

Test cells (FIG. 7) and secondary batteries (FIG. 1) were fabricated in the same manner as that of Example 1-1, except that natural graphite (Example 5-1) or artificial graphite (Example 5-2) was used instead of MCMB as a carbon material used for the (anode) active material layer. Further, as Comparative examples 5-1 and 5-2 thereto, test cells (FIG. 7) and secondary batteries (FIG. 1) were respectively fabricated in the same manner as that of Examples 5-1 and 5-2, except that the lithium-containing compound was not contained in the (anode) active material layer.

For the test cells (FIG. 7) and the secondary batteries (FIG. 1) of Examples 5-1 and 5-2, and Comparative examples 5-1 and 5-2, respective items of the discharge capacity, the initial charge and discharge efficiency, the battery capacity, and the capacity retention ratio were examined in the same manner as that of Example 1-1. The results are shown in Table 5 together with the results of Example 1-1 and Comparative example 1-1.

TABLE 4

Carbon material: spherocrystal graphitized substance of mesophase spherule (MCMB)
MCMB lattice spacing $d_{002}$: 0.3356 nm
Lithium-containing compound: $Li_{2.6}Co_{0.4}N$

| | Binder | Lithium-containing compound Average particle diameter (μm) | Content ratio (mass %) | Discharge capacity (mAh/g) | Initial charge and discharge efficiency (%) | Battery capacity (mAh) | Capacity retention ratio (%) |
|---|---|---|---|---|---|---|---|
| Example 1-1 | PVdF | 1.0 | 1.0 | 367 | 88.5 | 2176 | 84.6 |
| Example 4-1 | SBR | 1.0 | 1.0 | 367 | 96.8 | 2118 | 58.7 |
| Comparative example 1-1 | PVdF | — | — | 363 | 86.8 | 2141 | 73.5 |
| Comparative example 4-1 | SBR | — | — | 363 | 95.0 | 2126 | 52.8 |

TABLE 5

MCMB lattice spacing $d_{002}$: 0.3356 nm
Lithium-containing compound: $Li_{2.6}Co_{0.4}N$
Binder: PVdF

| | Carbon material | Lithium-containing compound Average particle diameter (μm) | Content ratio (mass %) | Discharge capacity (mAh/g) | Initial charge and discharge efficiency (%) | Battery capacity (mAh) | Capacity retention ratio (%) |
|---|---|---|---|---|---|---|---|
| Example 1-1 | MCMB | 1.0 | 1.0 | 367 | 88.5 | 2176 | 84.6 |
| Example 5-1 | Natural graphite | 1.0 | 1.0 | 368 | 88.6 | 2180 | 80.8 |
| Example 5-2 | Artificial graphite | 1.0 | 1.0 | 367 | 88.3 | 2175 | 82.9 |
| Comparative example 1-1 | MCMB | — | — | 363 | 86.8 | 2141 | 73.5 |
| Comparative example 5-1 | Natural graphite | — | — | 364 | 86.4 | 2145 | 70.1 |
| Comparative example 5-2 | Artificial graphite | — | — | 363 | 86.5 | 2140 | 71.7 |

As shown in Table 5, in the case where natural graphite or artificial graphite was used, there was a tendency similar to that in Example 1-1 using MCMB.

From the foregoing results, it was confirmed that in the case where various carbon materials and the lithium-containing compound such as $Li_{2.6}Co_{0.4}N$ were used together as an (anode) active material, a high energy density and superior cycle characteristics were able to be secured. It was confirmed that in the case where the average particle diameter of the lithium-containing compound was 1 μm or less, the content ratio of the lithium-containing compound in the (anode) active material was 25 mass % or less, the lattice spacing $d_{002}$ in the C-axis direction of the carbon material was in the range from 0.3350 nm to 0.3363 nm, both inclusive, and polyvinylidene fluoride was used as a binder of the (anode) active material, particularly superior performance was obtained.

In the foregoing examples, the description has been given of a case using the lithium cobalt complex nitride ($Li_{2.6}Co_{0.4}N$) as the lithium-containing compound. Meanwhile, when other lithium cobalt complex nitride such as $Li_{2.9}M_{0.1}N$ and $Li_{2.2}M_{0.8}N$ with a composition ratio of lithium (Li) and cobalt (Co) different from the foregoing composition ratio was used, similar tendency was obtained. Further, in the case where a transition metal element M was an element other than cobalt (Co) such as iron (Fe) and nickel (Ni), similar tendency was obtained as well.

The invention has been described with reference to the embodiment and the examples. However, the invention is not limited to the embodiment and the examples, and various modifications may be made. For example, in the foregoing embodiment and the foregoing examples, the description has been given of the battery using lithium as an electrode reactant. However, the invention is applicable to a case using other alkali metal such as sodium (Na) and potassium (K), an alkali earth metal such as magnesium and calcium (Ca), or other light metal such as aluminum. In this case, a cathode active material capable of inserting and extracting an electrode reactant and the like are selected according to the electrode reactant.

Further, in the foregoing embodiment and the foregoing examples, the descriptions have been given with the specific examples of the secondary batteries including the battery element having the cylindrical or flat (oval) spirally wound structure and the coin type secondary battery. However, the invention is similarly applicable to a secondary battery including a battery element having a polygonal spirally wound structure, a secondary battery having a structure in which a cathode and an anode are folded, or a secondary battery including a battery element having other structure such as a structure in which a plurality of cathodes and a plurality of anodes are layered. In addition, the invention is similarly applicable to a secondary battery having other package shape such as a square type secondary battery.

Further, in the foregoing embodiment and the foregoing examples, the descriptions have been given of the case using the liquid electrolytic solution as an electrolyte. However, a gel electrolyte in which an electrolytic solution is held by a retainer such as a polymer compound may be used. As such a polymer compound, for example, polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethylmethacrylate, polyacrylic acid, polymethacrylic acid, styrene-butadiene rubber, nitrile-butadiene rubber, polystyrene, or polycarbonate is included. In particular, in terms of electrochemical stability, polyacrylonitrile, polyvinylidene fluoride, polyhexafluoropropylene, or polyethylene oxide is preferable. The ratio of the polymer compound to the electrolytic solution depends on the compatibility thereof, but in general, a polymer compound corresponding to 5 mass % or more and 50 mass % or less of the electrolytic solution is preferably added.

Furthermore, in the foregoing embodiment and the foregoing examples, for the content ratio of the lithium-containing compound contained in the anode active material of the secondary battery of the invention and the lattice spacing $d_{002}$ in the C-axis direction of the carbon material calculated by X-ray diffraction, the appropriate range derived from the results of the examples has been described. However, such a description does not totally eliminate the possibility that each parameter may be out of the foregoing range. That is, the foregoing appropriate range is the range particularly preferable for obtaining the effects of the invention. Therefore, as long as effects of the invention is obtained, each parameter may be out of the foregoing range in some degrees.

It should be understood by those skilled in the art that various modifications, combinations, sub-combinations and alternations may occur depending on design requirements and other factors insofar as they are within the scope of the appended claims or the equivalents thereof.

What is claimed is:

1. An anode comprising an anode active material layer, the anode active material layer including:
   a carbon material and a lithium containing compound represented by the formula: $Li_{3-a}M_aN$, where M is one or more transition metal elements and a is $0<a\leq0.8$, wherein,
   the lithium-containing compound has an average particle diameter of 1 μm, and
   the lithium-containing compound is present in the anode active material in the amount from and including 5 to 10 mass %.

2. The anode according to claim 1, wherein the anode active material layer contains polyvinylidene fluoride.

3. The anode according to claim 1, wherein M is cobalt.

4. The anode according to claim 1, wherein and the carbon material contains graphite in which lattice spacing in the C-axis direction in X-ray diffraction is in the range from and including 0.3350 nm to 0.3363 nm.

5. A secondary battery comprising:
   a cathode;
   an anode; and
   an electrolytic solution,
   wherein,
   the anode has an anode active material layer containing a carbon material and a lithium compound represented by the formula: $Li_{3-a}M_aN$, where M is one or more transition metal elements and a is $0<a\leq0.8$, and
   the lithium-containing compound has an average particle diameter of 1 μm and,
   the lithium-containing compound is present in the anode active material in the amount from and including 5 to 10 mass %.

6. The secondary battery according to claim 5, wherein the anode active material layer contains polyvinylidene fluoride.

7. The secondary battery according to claim 5, wherein M is cobalt.

8. The secondary battery according to claim 5 wherein and the carbon material contains graphite in which lattice spacing in the C-axis direction in X-ray diffraction is in the range from and including 0.3350 nm to 0.3363 nm.

* * * * *